United States Patent
Avsar

(10) Patent No.: US 8,793,833 B2
(45) Date of Patent: Aug. 5, 2014

(54) WINDSCREEN WIPER DEVICE

(75) Inventor: Erdal Avsar, Longuy (FR)

(73) Assignee: Federal-Mogul S.A., Aubange (BE)

( * ) Notice: Subject to any disclaimer, the term of this patent is extended or adjusted under 35 U.S.C. 154(b) by 182 days.

(21) Appl. No.: 12/933,458

(22) PCT Filed: Mar. 2, 2009

(86) PCT No.: PCT/EP2009/052465
§ 371 (c)(1),
(2), (4) Date: Sep. 20, 2010

(87) PCT Pub. No.: WO2009/115408
PCT Pub. Date: Sep. 24, 2009

(65) Prior Publication Data
US 2011/0047741 A1 Mar. 3, 2011

(30) Foreign Application Priority Data

Mar. 19, 2008 (EP) .................................... 08102748

(51) Int. Cl.
*B60S 1/40* (2006.01)
(52) U.S. Cl.
USPC .......... 15/250.452; 152/250.451; 152/250.43; 152/250.48; 152/250.201
(58) Field of Classification Search
CPC .... B60S 1/3893; B60S 1/3889; B60S 1/3891; B60S 1/3894; B60S 1/3896; B60S 1/3886
USPC ......... 15/250.43, 250.201, 250.361, 250.451, 15/250.452, 250.44
See application file for complete search history.

(56) References Cited

U.S. PATENT DOCUMENTS

| | | | | |
|---|---|---|---|---|
| 2,766,474 A | * | 10/1956 | Horton | 15/250.452 |
| 5,964,025 A | * | 10/1999 | Buechele | 29/558 |
| 6,185,805 B1 | * | 2/2001 | Rosiere et al. | 29/428 |
| 2007/0011840 A1 | * | 1/2007 | Gilli | 15/250.352 |
| 2008/0016643 A1 | * | 1/2008 | Braun et al. | 15/250.361 |

FOREIGN PATENT DOCUMENTS

| | | | | |
|---|---|---|---|---|
| DE | 200510052258 A1 | 5/2007 | | |
| EP | 0007017 A1 | * | 1/1980 | B60S 1/38 |
| EP | 1 816 041 A | 8/2007 | | |
| EP | 1 857 337 A | 11/2007 | | |
| FR | 2595642 A1 | * | 9/1987 | B60S 1/38 |

(Continued)

OTHER PUBLICATIONS

EP0007017A1 (machine translation), 1980.*

(Continued)

*Primary Examiner* — Mark Spisich
*Assistant Examiner* — Andrew A Horton
(74) *Attorney, Agent, or Firm* — Robert L. Stearns; Dickinson Wright, PLLC

(57) ABSTRACT

A windscreen wiper device including an elastic, elongated carrier element and an elongated wiper blade of a flexible material that can be placed in abutment with a windscreen to be wiped is provided. The wiper blade includes longitudinal grooves on its longitudinal sides, and spaced-apart longitudinal strips of the carrier element are disposed in the longitudinal grooves. Neighboring ends of the longitudinal strips are interconnected with one another by a respective connecting piece. The windscreen wiper device also includes a connecting device for attachment with an oscillating wiper arm. At least one of the connecting pieces includes an opening, and the wiper blade permanently extends through the opening and beyond the connecting piece.

10 Claims, 3 Drawing Sheets

(56) References Cited

FOREIGN PATENT DOCUMENTS

| FR | 2 635 495 A | 2/1990 |
| FR | 2 905 650 A | 3/2014 |
| WO | WO 2005115813 A1 * | 12/2005 |
| WO | WO 2007051669 A1 * | 5/2007 ................ B60S 1/38 |

OTHER PUBLICATIONS

WO2007051669A1 (machine translation), 2007.*

* cited by examiner

WINDSCREEN WIPER DEVICE

BACKGROUND OF THE INVENTION

1. Technical Field

The present invention relates to a windscreen wiper device comprising an elastic, elongated carrier element, as well as an elongated wiper blade of a flexible material, which can be placed in abutment with a windscreen to be wiped, which wiper blade includes opposing longitudinal grooves on its longitudinal sides, in which grooves spaced-apart longitudinal strips of the carrier element are disposed, wherein neighboring ends of the longitudinal strips are interconnected by a respective connecting piece, which windscreen wiper device comprises a connecting device for an oscillating wiper arm.

2. Related Art

Such a windscreen wiper device is known from European patent publication no. 1 491 416 of the same Applicant. The prior art windscreen wiper device is in particular designed as a "yokeless" wiper device or "flat blade", wherein use is no longer made of several yokes pivotally connected to each other, but wherein the wiper blade is biased by the carrier element, as a result of which it exhibits a specific curvature. According to the prior art the connecting piece is slided over the neighboring ends of the strips—or vice versa, that is the neighboring ends of the strips are slided into the connecting piece—so that a reliable snap connection between these parts is realized. In the prior art the connecting piece is provided with an opening at its free end so that the wiper blade can freely slide through the connecting piece. In other words, the connecting pieces do not retain the wiper blade, so that the connecting pieces allow a relative movement of the wiper blade along the longitudinal strips in the connecting pieces.

One drawback of the prior art windscreen wiper device is the fact that the connecting pieces (in practice also called "end caps") and the wiper blade are not connected in a durable, solid manner. Particularly, when a spoiler is only retained onto the strips (and not onto an upper part of the wiper blade facing away from the windscreen to be wiped), the wiper blade may come loose from the connecting pieces. As a result, the life span of the prior art windscreen wiper device may be seriously shortened.

SUMMARY OF THE INVENTION AND ADVANTAGES

The object of the invention is to improve the prior art as indicated above, in particular to provide a windscreen wiper device, wherein the longitudinal strips and the connecting pieces ("end caps") are interconnected in a durable, solid manner, and wherein the wiping properties are improved.

In order to accomplish that objective, a windscreen wiper device of the kind referred to in the introduction according to the invention is characterized in that an end wall of at least one connecting piece comprises an opening, wherein the wiper blade permanently extends through the opening and beyond the connecting piece. As the wiper blade permanently sticks out with respect to the connecting piece, a larger wiping area compared to that of the prior art is obtained, thus improving the wiping properties. As a free sliding movement of the wiper blade is avoided, the connection piece can be firmly attached onto the wiper blade. Particularly, the wiper blade and the connecting piece comprise mutually cooperating means to block a longitudinal movement of the wiper blade in outward direction relative to the connecting piece.

It is noted that the present invention is not restricted to windscreen wiper devices for cars, but that it also relates to windscreen wiper devices for rail coaches and all other (fast) vehicles.

In one preferred embodiment of a windscreen wiper device in accordance with the invention, the grooves of the wiper blade each comprise at least one stop for blocking the longitudinal movement of the wiper blade in outward direction relative to the connecting piece. Preferably, the stops comprise a protrusion extending laterally from a longitudinal wall of the wiper blade located between the two opposing grooves.

In another preferred embodiment of a windscreen wiper device according to the invention, the connecting piece comprises at least two protrusions extending laterally inwardly, and wherein each protrusion is adjacent a corresponding stop on the wiper blade for blocking the longitudinal movement of the wiper blade in outward direction relative to the connecting piece. In other words, the protrusions on the connecting piece and the stops on the wiper blade may be spaced apart during normal use of the windscreen wipe device. However, under the influence of any longitudinal outwardly directed force on the wiper blade, the wiper blade is allowed to move in longitudinal outward direction, causing the stops on the wiper blade to correspondingly move towards the protrusions on the connecting piece, until the protrusions on the connecting piece and the stops on the wiper blade are adjacent one another.

In another preferred embodiment of a windscreen wiper device in accordance with the invention, the wiper blade and the strips comprise mutually cooperating means to block a longitudinal movement of the wiper blade in outward direction relative to the connecting piece.

In another preferred embodiment of a windscreen wiper device according to the invention, the grooves of the wiper blade each comprise at least one stop for blocking the longitudinal movement of the wiper blade in outward direction relative to the connecting piece. Particularly, the stops comprise a protrusion extending laterally from a longitudinal wall of the wiper blade located between the two opposing grooves.

In another preferred embodiment of a windscreen wiper device in accordance with the invention each strip is provided on its interior longitudinal edge with a hole within the outer contour thereof, and wherein each stop is located within a corresponding hole in the strips. Preferably, the holes have a non-closed circumference.

In particular the stops are made integral with the wiper blade. Particularly, a moulding operation would ensure that the stops can be formed in a reliable and controllable manner, without high costs as far as additional tools and equipment are concerned. Also the protrusions on the connecting piece are preferably in one piece therewith. The hole on the strip is particularly stamped or punched, so that the shape of the hole can be accurately controlled.

THE DRAWINGS

The invention will now be explained in more detail with reference to figures illustrated in a drawing, wherein.

DETAILED DESCRIPTION

Figure 1:
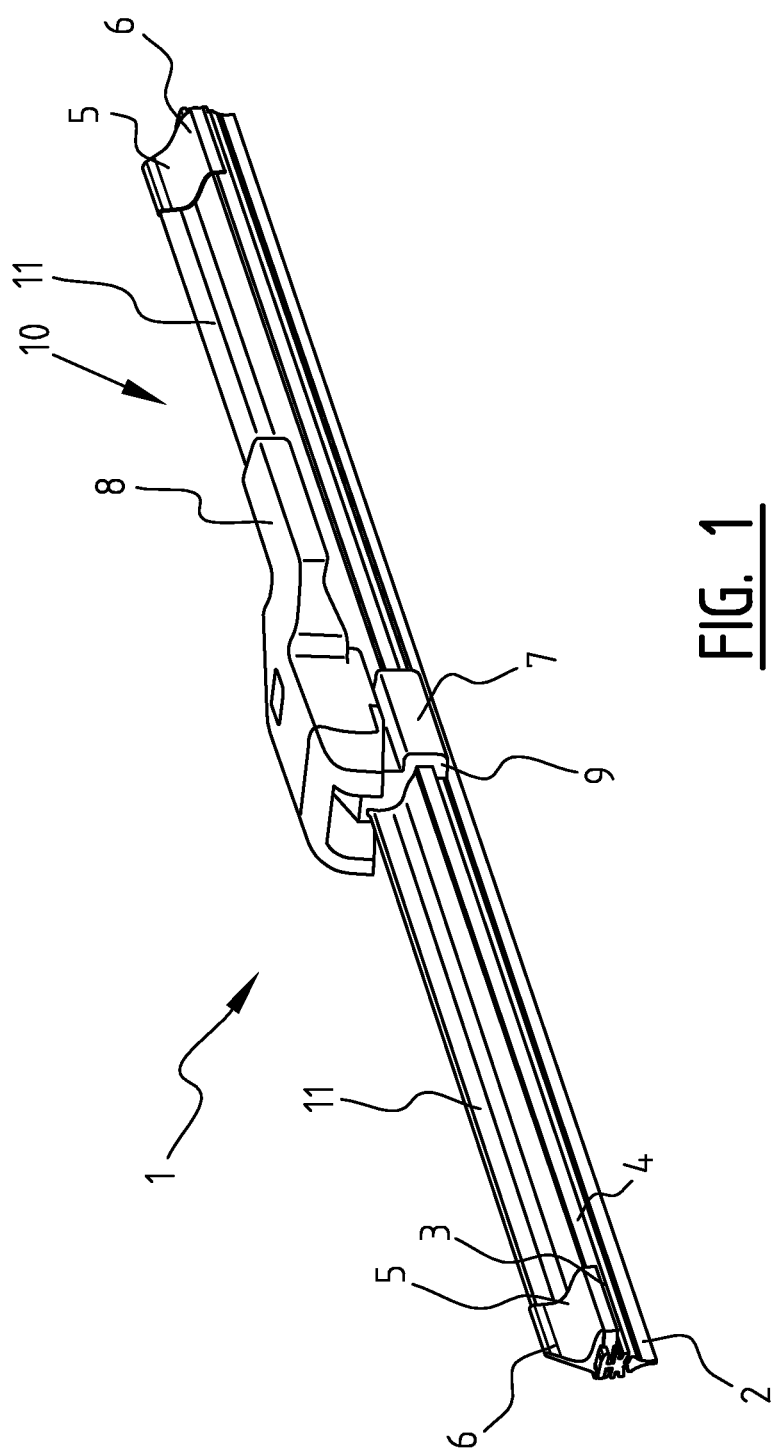
FIG. 1 is a total perspective, schematic view of a windscreen wiper device according to the invention.

FIG. 1 shows a preferred variant of a windscreen wiper device 1 according to the invention, the windscreen wiper device is built up of an elastomeric wiper blade 2, in the longitudinal sides of which opposing longitudinal grooves 3 are formed, and of longitudinal strips 4 made of spring band steel, which are fitted in the longitudinal grooves 3. The strips 4 form a flexible carrier element for the rubber wiper blade 2, as it were, which is thus biased in a curved position (the curvature in operative position being that of a windscreen to be wiped). Neighboring ends 5 of strips 4 are interconnected on either side of the windscreen wiper device 1 by means of connecting pieces 6 functioning as clamping members. In this embodiment, the connecting pieces 6 are separate constructional elements, which may be form-locked as well as force-locked to the ends 5 of strips 4. In another preferred variant, the connecting pieces 6 are in one piece with the strips 4 made of spring band steel. In the latter case the connecting pieces form transverse bridges for the strips 4, as it were. The windscreen wiper device 1 is furthermore built up of a connecting device 7 of plastic material for an oscillating wiper arm 8. Connecting device 7 comprises clamping members 9 that are integral therewith, which engage round longitudinal sides of the strips 4 that face away from each other, as a result of which the connecting device 7 is firmly attached to the unit consisting of wiper blade 2 and strips 4. The oscillating wiper arm 8 is pivotally connected to the connecting device 7 about a pivot axis near one end. The preferred embodiment of FIG. 5 according to the invention comprises a spoiler or "air deflector" Io including two separate sub-spoilers 11. Each sub-spoiler 11 is detachably connected in its entirety to the wiper blade 2 on opposite sides of the connecting device 7.

Figure 2A:
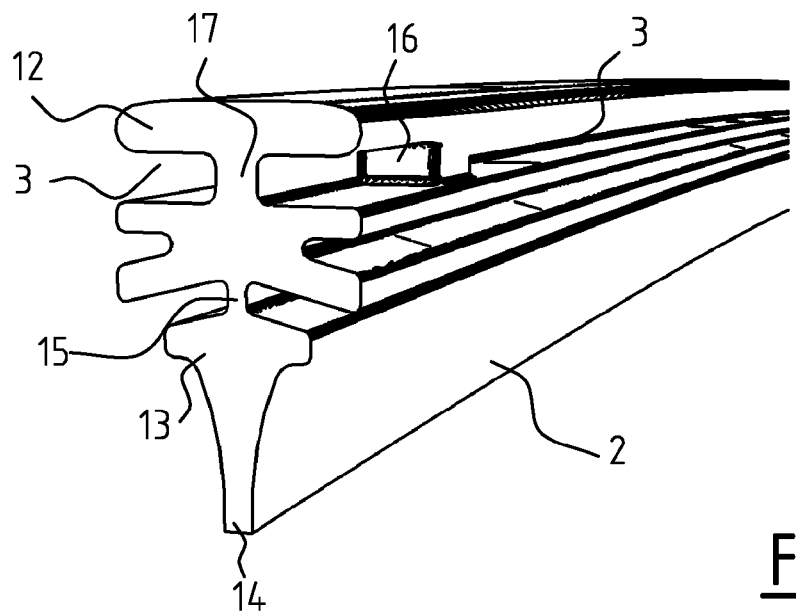
FIGS. 2a-2c and 3a-3c are side views and perspective views of parts of a wiper blade as used in the windscreen wiper device of FIG. 1
Figure 2B:
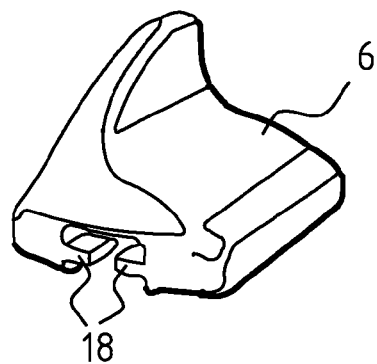
Figure 2C:
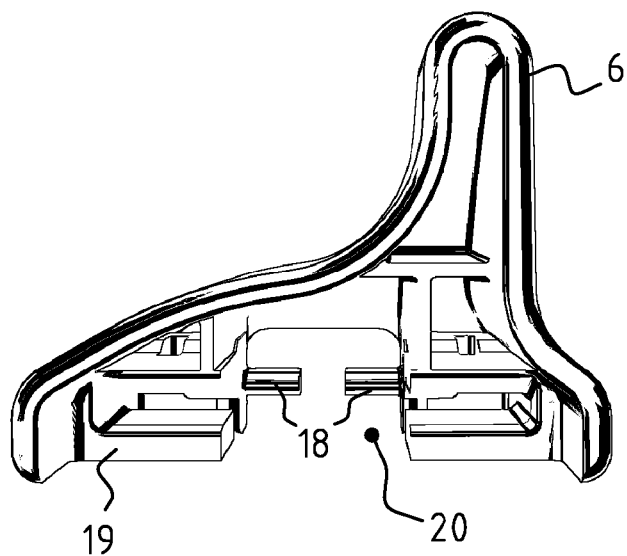

In FIG. 2a perspective view of the wiper blade 2 of FIG. 1 is shown, wherein corresponding parts have been designated with the same reference numerals. As can be seen from FIG. 2a, the rubber wiper blade 2 consists of an elongated upper holding part 12 holding the longitudinal strips 4 in the grooves 3 formed therein, an elongated lower wiping part 13 having a wiping lip 14, as well as an intermediate "strip-like" titling web 15 interconnecting the holding part 12 and the wiping part 13, the holding part 12, the wiping part 13 and the tilting web 15 are in one piece of rubber. The grooves 3 of the wiper blade 2 each comprise at least one stop 16 for blocking a longitudinal movement of the wiper blade 2 in outward direction relative to the connecting piece 6. As can be seen in FIG. 2a, these stops 16 comprise a protrusion extending laterally from a longitudinal wall 17 of the wiper blade 2 located between the two opposing grooves 3. With reference to FIGS. 2b and 2c the connecting piece 6 comprises at least two protrusions 18 extending laterally inwardly. Under the influence of any longitudinal outwardly directed force on the wiper blade 2, the wiper blade 2 is allowed to move in longitudinal outward direction, causing the stops 16 on the wiper blade 2 to correspondingly move towards the protrusions 18 on the connecting piece 6, until the protrusions 18 on the connecting piece 6 and the stops 16 on the wiper blade 2 are adjacent one another.

Figure 3A:
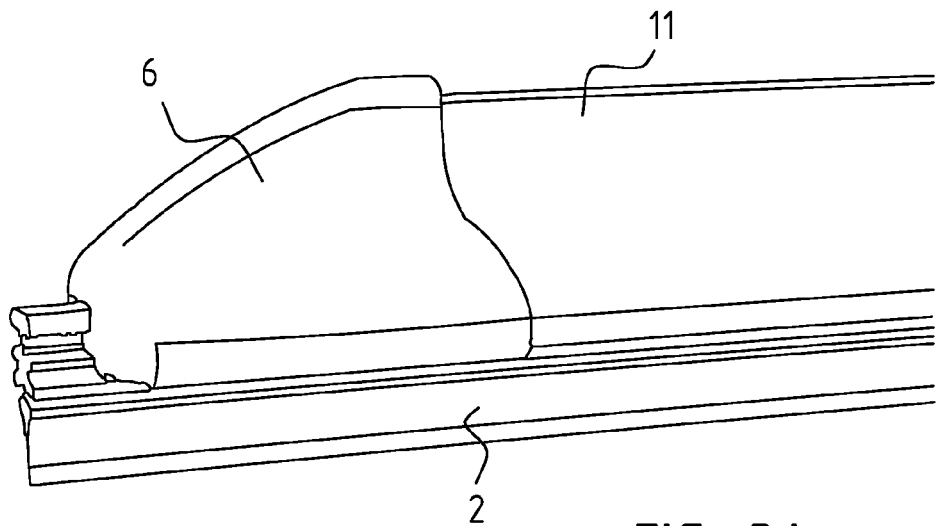
Figure 3B:
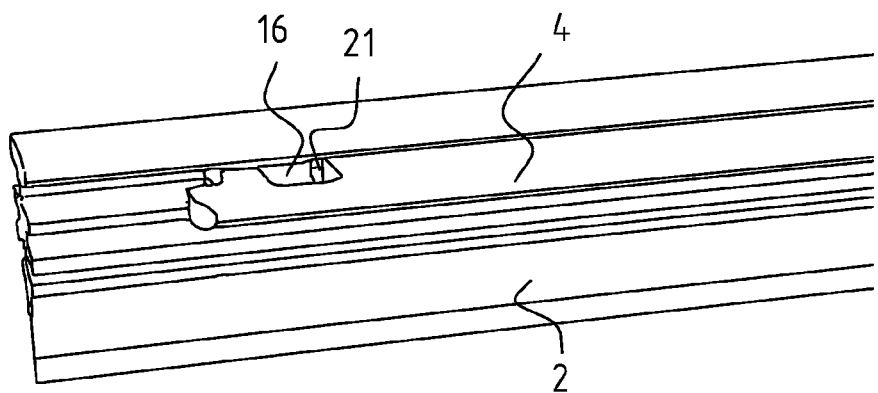
Figure 3C:
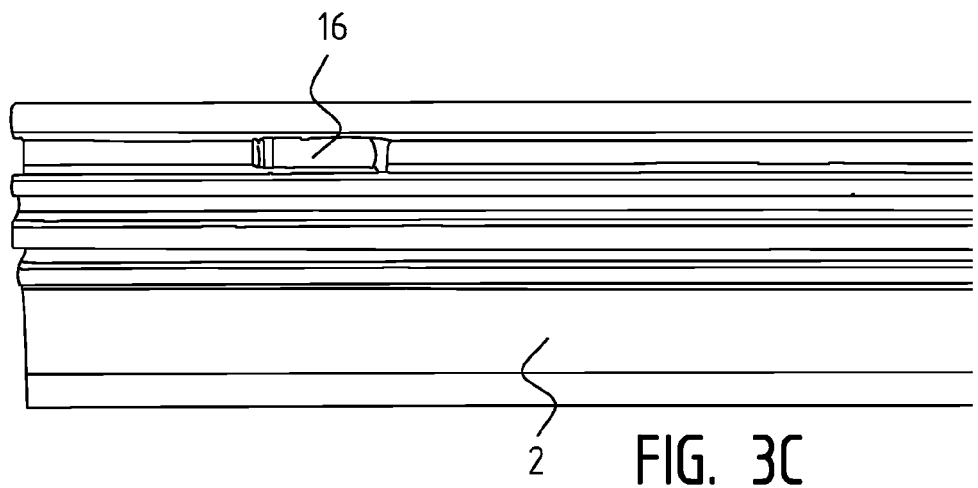

An end wall 19 of the connecting piece 6 comprises an opening 20, wherein the wiper blade 2 permanently extends through the opening 20 and beyond the connecting piece 6 (FIGS. 2c and 3a). With reference to FIGS. 3b and 3c each strip 4 is provided on its interior longitudinal edge with a hole 21 (having a non-closed circumference) within the outer contour thereof, wherein each stop 16 is located within a corresponding hole 21 in the strips 4. Thus, a longitudinal movement of the wiper blade 2 is blocked thereby.

Although not shown in FIGS. 1, 2 and 3, but fully understood by a skilled person, the oscillating arm 8 is connected to a mounting head fixed for rotation to a shaft driven by a small motor. In use, the shaft rotates alternately in a clockwise and in a counter-clockwise sense carrying the mounting head into rotation also, which in turn draws the oscillating arm 8 into rotation and by means of the connecting device 7 moves the wiper blade 2.

The invention is not restricted to the embodiments shown, but also extends to other preferred embodiments falling within the scope of the appended claims.

The invention claimed is:

1. A windscreen wiper device comprising an elastic, elongated carrier element, as well as an elongated wiper blade of a flexible material, which can be placed in abutment with a windscreen to be wiped, said wiper blade including opposing longitudinal grooves on its longitudinal sides, in which grooves spaced-apart longitudinal strips of the carrier element are disposed, wherein neighboring ends of said longitudinal strips are interconnected by end caps such that the end caps are force locked or form locked to the end of the strips, and said windscreen wiper blade further comprising a connecting device for an oscillating wiper arm, wherein an end wall of at least one of said end caps comprises an opening, wherein said wiper blade permanently extends through said opening and beyond said at least one end cap and beyond said ends of said longitudinal strips, and wherein said end caps fully cover the ends of the strips.

2. A windscreen wiper device according to claim 1, wherein said wiper blade and said at least one end cap mutually cooperate to confront and block longitudinal movement of said wiper blade in an outward direction relative to said at least one end cap.

3. A windscreen wiper device according to claim 2, wherein said grooves of said wiper blade each comprise at least one stop for blocking said longitudinal movement of said wiper blade in said outward direction relative to said at least one end cap.

4. A windscreen wiper device according to claim 3, wherein said stops comprise a protrusion extending laterally from a longitudinal wall of said wiper blade located between said two opposing grooves.

5. A windscreen wiper device according to claim 3, wherein said at least one end cap comprises at least two protrusions extending laterally inwardly, and wherein each protrusion is adjacent a corresponding stop on said wiper blade for blocking said longitudinal movement of said wiper blade in said outward direction relative to said at least one end cap.

6. A windscreen wiper device according to claim 1, wherein said wiper blade and said strips mutually cooperate to confront and block longitudinal movement of said wiper blade in an outward direction relative to said at least one end cap.

7. A windscreen wiper device according to claim 6, wherein said grooves of said wiper blade each comprise at least one stop for blocking said longitudinal movement of said wiper blade in said outward direction relative to said at least one end cap.

8. A windscreen wiper device according to claim 7, wherein said stops comprise a protrusion extending laterally from a longitudinal wall of said wiper blade located between said two opposing grooves.

9. A windscreen wiper device according to claim 7, wherein each strip is provided on its interior longitudinal edge with a hole within an outer contour thereof, and wherein each stop is located within a corresponding one of said holes in said strips.

10. A windscreen wiper device according to claim 9, wherein said holes have a non-closed circumference.

* * * * *